US006042129A

United States Patent [19]
Simpo

[11] Patent Number: 6,042,129
[45] Date of Patent: Mar. 28, 2000

[54] ALL-TERRAIN BABY STROLLER

[76] Inventor: Edward Simpo, 27 Martin Ct., Daly City, Calif. 94014

[21] Appl. No.: 09/233,946

[22] Filed: Jan. 20, 1999

[51] Int. Cl.[7] ........................................................ B62B 9/00
[52] U.S. Cl. ................. 280/47.41; 16/111 R; 280/47.38; 297/184.12
[58] Field of Search .................... 114/191, 194; 297/277, 184.11, 184.12, 184.13, 184.14; 296/35.4; 280/30, 204, 47.38, 47.4, 47.41; 16/111 R

[56] References Cited

U.S. PATENT DOCUMENTS

| | | | |
|---|---|---|---|
| 1,569,249 | 1/1926 | Anthony | 114/194 X |
| 1,689,964 | 10/1928 | Perego | 114/194 |
| 4,412,595 | 11/1983 | Kinzel | 180/211 |
| 4,537,414 | 8/1985 | Nusbaum | 280/30 X |
| 4,844,452 | 7/1989 | Tomosky | 272/85 |
| 4,953,880 | 9/1990 | Sudakoff | 280/47 |
| 5,100,198 | 3/1992 | Baltzell | 280/30 X |
| 5,158,319 | 10/1992 | Norcia | 280/643 |
| 5,188,380 | 2/1993 | Tucek | 280/30 |
| 5,267,744 | 12/1993 | Berry et al. | 280/204 |
| 5,269,544 | 12/1993 | Park | 280/5.24 |
| 5,308,096 | 5/1994 | Smith | 280/204 |
| 5,536,027 | 7/1996 | Gollub | 280/30 |
| 5,645,290 | 7/1997 | Gaffney et al. | 280/47.4 X |
| 5,884,920 | 3/1999 | Seto | 280/30 X |

*Primary Examiner*—Michael Mar
*Attorney, Agent, or Firm*—Goldstein & Canino

[57] ABSTRACT

An all-terrain baby stroller including a shell portion having an aperture formed in a top portion exposing a hollow interior thereof. The shell portion has four recesses extending inwardly of a lower surface thereof in four corners thereof. Each of the recesses has a support bar extending between opposing sides thereof in a horizontal orientation. Four wheels are received within the four recesses in the planar lower portion of the shell portion. The four wheels are rotatably disposed on the support bars of the recesses. Each of the wheels have a central portion and pair of opposed outer portions. The pair of opposed outer portions are disposed on opposite sides of the central portion. The central portion has a diameter greater than a diameter of the opposed outer portions. A child seat is pivotally coupled with the shell within the hollow interior thereof. The child seat has a support rod extending upwardly from a top of a seat back thereof. An upper end of the support rod extends outwardly of the aperture of the shell portion. The upper end of the support rod has a ball secured thereto. The ball has a diameter greater than a diameter of the aperture whereby the ball seats within the aperture.

1 Claim, 2 Drawing Sheets

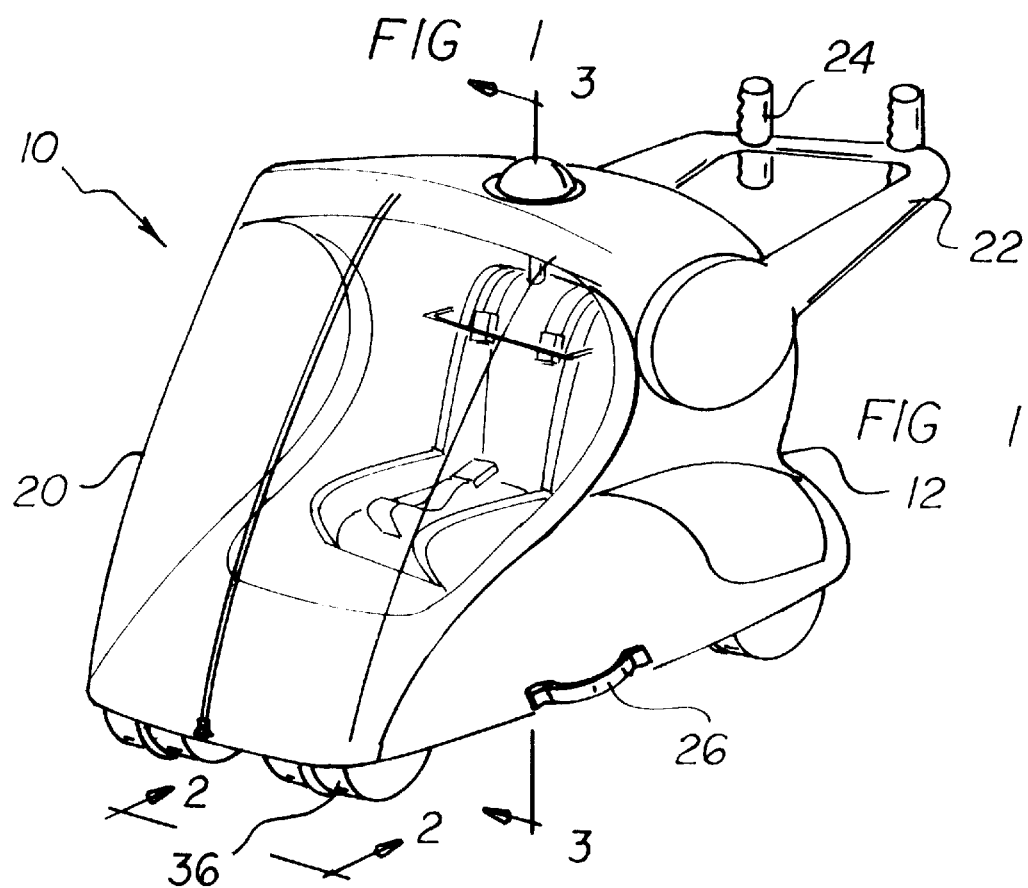
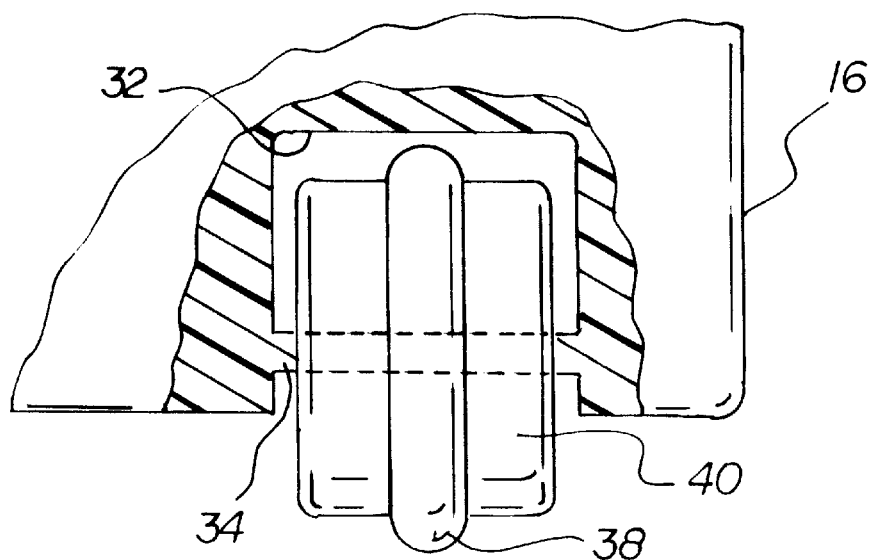

ALL-TERRAIN BABY STROLLER

BACKGROUND OF THE INVENTION

1. Field of the Invention

The present invention relates to an all-terrain baby stroller and more particularly pertains to transporting a baby on uneven terrains with an all-terrain baby stroller.

2. Description of the Prior Art

The use of baby strollers is known in the prior art. More specifically, baby strollers heretofore devised and utilized for the purpose of transporting babies are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,412,595 to Kinzel; U.S. Pat. No. 4,844,452 to Tomosky et al.; U.S. Pat. No. 4,953,880 to Sudakoff et al.; U.S. Pat. No. 5,158,319 to Norcia et al.; U.S. Pat. No. 5,269,544 to Park; and U.S. Pat. No. 5,536,027 to Gollub.

While these devices fulfill their respective, particular objective and requirements, the aforementioned patents do not describe an all-terrain baby stroller for transporting a baby on uneven terrains.

In this respect, the all-terrain baby stroller according to the present invention substantially departs from the conventional concepts and designs of the prior art, and in doing so provides an apparatus primarily developed for the purpose of transporting a baby on uneven terrains.

Therefore, it can be appreciated that there exists a continuing need for new and improved all-terrain baby stroller which can be used for transporting a baby on uneven terrains. In this regard, the present invention substantially fulfills this need.

SUMMARY OF THE INVENTION

In the view of the foregoing disadvantages inherent in the known types of baby strollers now present in the prior art, the present invention provides an improved all-terrain baby stroller. As such, the general purpose of the present invention, which will be described subsequently in greater detail, is to provide a new and improved all-terrain baby stroller and method which has all the advantages of the prior art and none of the disadvantages.

To attain this, the present invention essentially comprises a shell portion comprised of an arcuate upper portion and a planar lower portion. The arcuate upper portion has a cutout formed in a front portion thereof. The cutout has a transparent shield removably coupled thereto. A rear portion of the arcuate upper portion has a U-shaped handle secured thereto. An outer portion of the U-shaped handle has a pair of upwardly extending gripping members secured thereto. Opposing sides of the planar lower portion have carrying handles secured thereto. An upper section of the arcuate upper portion has an aperture formed therein exposing a hollow interior of the shell portion. The aperture has a bearing race disposed around a periphery thereof. The planar lower portion has four recesses extending inwardly of a lower surface thereof in four corners thereof. Each of the recesses has a support bar extending between opposing sides thereof in a horizontal orientation. Four wheels are received within the four recesses in the planar lower portion of the shell portion. The four wheels are rotatably disposed on the support bars of the recesses. Each of the wheels have a central portion and pair of opposed outer portions. The pair of opposed outer portions are disposed on opposite sides of the central portion. The central portion has a diameter greater than a diameter of the opposed outer portions. A child seat is pivotally coupled with the shell within the hollow interior thereof. The child seat has a support rod extending upwardly from a top of a seat back thereof. An upper end of the support rod extends outwardly of the aperture of the shell portion. The upper end of the support rod has a ball secured thereto. The ball has a diameter greater than a diameter of the aperture whereby the ball seats within the aperture on the bearing race thereof.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved all-terrain baby stroller which has all the advantages of the prior art baby strollers and none of the disadvantages.

It is another object of the present invention to provide a new and improved all-terrain baby stroller which may be easily and efficiently manufactured and marketed.

It is a further object of the present invention to provide a new and improved all-terrain baby stroller which is of durable and reliable construction.

An even further object of the present invention is to provide a new and improved all-terrain baby stroller which is susceptible of a low cost of manufacture with regard to both materials and labor, and which accordingly is then susceptible of low prices of sale to the consuming public, thereby making such an all-terrain baby stroller economically available to the buying public.

Even still another object of the present invention is to provide a new and improved all-terrain baby stroller for transporting a baby on uneven terrains.

Lastly, it is an object of the present invention to provide a new and improved all-terrain baby stroller including a shell portion having an aperture formed in a top portion exposing a hollow interior thereof. The shell portion has four recesses extending inwardly of a lower surface thereof in four corners thereof. Each of the recesses has a support bar extending between opposing sides thereof in a horizontal orientation. Four wheels are received within the four recesses in the planar lower portion of the shell portion. The four wheels are rotatably disposed on the support bars of the recesses. Each of the wheels have a central portion and pair of opposed outer portions. The pair of opposed outer portions are disposed on opposite sides of the central portion. The central portion has a diameter greater than a diameter of the opposed outer portions. A child seat is pivotally coupled with the shell within the hollow interior thereof. The child seat has a support rod extending upwardly from a top of a seat back thereof. An upper end of the support rod extends outwardly of the aperture of the shell portion. The upper end of the support rod has a ball secured thereto. The ball has a diameter greater than a diameter of the aperture whereby the ball seats within the aperture.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the all-terrain baby stroller constructed in accordance with the principles of the present invention.

FIG. 2 is a front view of the wheel of the present invention as taken along line 2—2 of FIG. 1.

The same reference numerals refer to the same parts through the various figures.

DESCRIPTION OF THE PREFERRED EMBODIMENT

Figure 3:
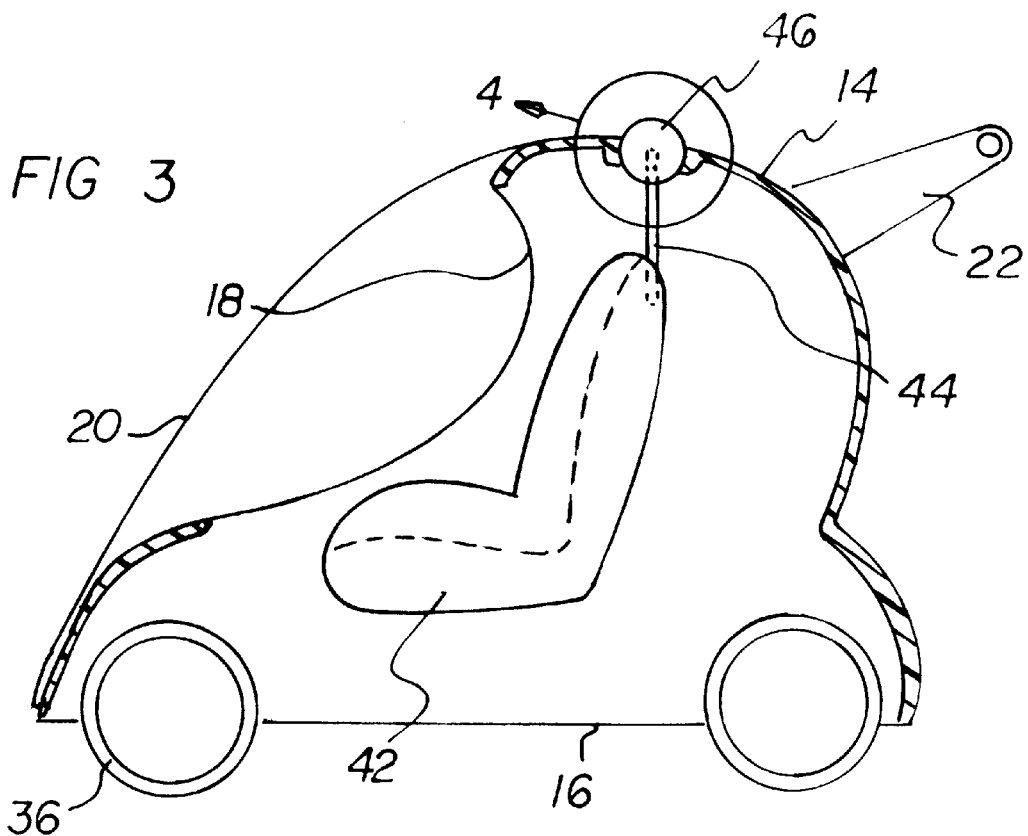
FIG. 3 is a cross-sectional view of the present invention as taken along line 3—3 of FIG. 1.
Figure 4:
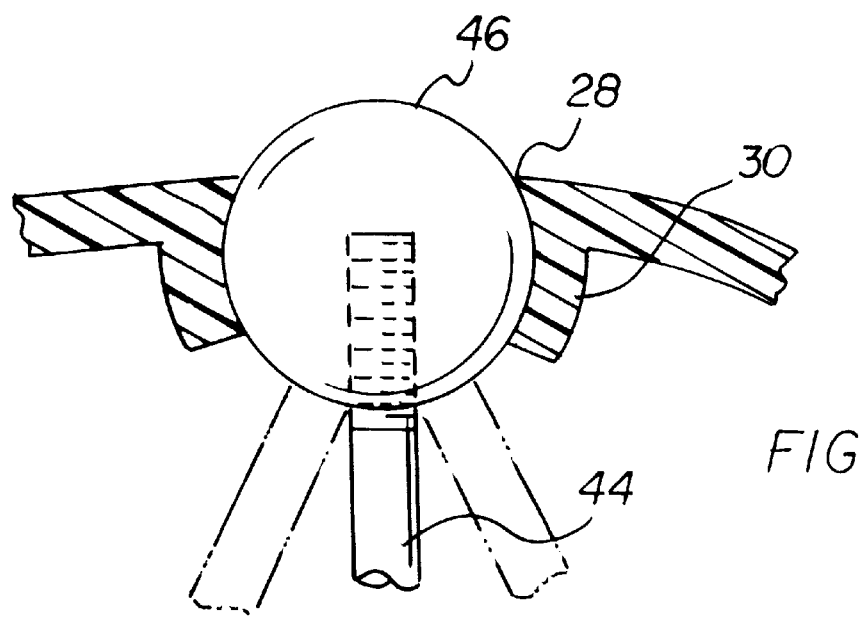
FIG. 4 is a enlarged sectional view of the present invention illustrating the coupling of the baby seat to the shell as taken from circle 4 of FIG. 3.

With reference now to the drawings, and in particular, to FIGS. 1 through 4 thereof, the preferred embodiment of the new and improved all-terrain baby stroller embodying the principles and concepts of the present invention and generally designated by the reference number 10 will be described.

Specifically, it will be noted in the various Figures that the device relates to a all-terrain baby stroller for transporting a baby on uneven terrains. In its broadest context, the device consists of a shell portion, four wheels, and a child seat. Such components are individually configured and correlated with respect to each other so as to attain the desired objective.

The shell portion 12 is comprised of an arcuate upper portion 14 and a planar lower portion 16. The arcuate upper portion 14 has a cutout 18 formed in a front portion thereof. The cutout 18 has a transparent shield 20 removably coupled thereto. A rear portion of the arcuate upper portion has a U-shaped handle 22 secured thereto. An outer portion of the U-shaped handle 22 has a pair of upwardly extending gripping members 24 secured thereto. Opposing sides of the planar lower portion 16 have carrying handles 26 secured thereto. An upper section of the arcuate upper portion 14 has an aperture 28 formed therein exposing a hollow interior of the shell portion 12. The aperture 28 has a bearing race 30 disposed around a periphery thereof. The planar lower portion has four recesses 32 extending inwardly of a lower surface thereof in four corners thereof. Each of the recesses 32 has a support bar 34 extending between opposing sides thereof in a horizontal orientation.

The four wheels 36 are received within the four recesses 32 in the planar lower portion 16 of the shell portion 12. The four wheels 36 are rotatably disposed on the support bars 34 of the recesses 32. Each of the wheels 36 have a central portion 38 and pair of opposed outer portions 40. The pair of opposed outer portions 40 are disposed on opposite sides of the central portion 38. The central portion 38 has a diameter greater than a diameter of the opposed outer portions 40. The arrangement of the wheels 36 provides greater traction, particularly on sand and other soft terrain. This arrangement allows for the central portion 38 to sink within the sand and thereby allow the outer portions 40 to ride on the surface of the sand.

The child seat 42 is pivotally coupled with the shell portion 12 within the hollow interior thereof. The child seat 42 has a support rod 44 extending upwardly from a top of a seat back thereof. An upper end of the support rod 44 extends outwardly of the aperture 28 of the shell portion 12. The upper end of the support rod 44 has a ball 46 secured thereto. The ball 46 has a diameter greater than a diameter of the aperture 28 whereby the ball 46 seats within the aperture 28 on the bearing race 30 thereof. This arrangement allows for the child seat 42 to always be disposed in an upright orientation, no matter the angle of the shell portion 12 with respect to a recipient surface.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An all-terrain baby stroller for transporting a baby on uneven terrains comprising, in combination:

a shell portion comprised of an arcuate upper portion and a planar lower portion, the arcuate upper portion having a cutout formed in a front portion thereof, the cutout having a transparent shield removably coupled thereto, a rear portion of the arcuate upper portion having a U-shaped handle secured thereto, an outer portion of the U-shaped handle having a pair of upwardly extending gripping members secured thereto, opposing sides of the planar lower portion having carrying handles secured thereto, an upper section of the arcuate upper portion having an aperture formed therein exposing a hollow interior of the shell portion, the aperture having a circular bearing race disposed around a lower periphery thereof, the planar lower portion having four recesses extending inwardly of a lower surface thereof in four corners thereof, each of the recesses having a support bar extending between opposing sides thereof in a horizontal orientation;

four wheels received within the four recesses in the planar lower portion of the shell portion, the four wheels being rotatably disposed on the support bars of the recesses, each of the wheels having a central portion and pair of opposed outer portions, the pair of opposed outer portions being disposed on opposite sides of the central portion, the central portion having a diameter greater than a diameter of the opposed outer portions;

a child seat pivotally coupled with the shell portion within the hollow interior thereof, the child seat having a support rod extending upwardly from a top of a seat back thereof, an upper end of the support rod extending through the circular bearing race, the upper end of the support rod having a ball secured thereto, the ball having a diameter greater than a diameter of the aperture whereby the ball seats within the aperture on the bearing race thereof and extends outwardly of the aperture of the shell portion.

\* \* \* \* \*